(12) United States Patent
Jain et al.

(10) Patent No.: US 8,811,991 B2
(45) Date of Patent: Aug. 19, 2014

(54) WIRELESS HANDOFFS BETWEEN MULTIPLE WIRELESS NETWORKS

(75) Inventors: Nikhil Jain, Mendham, NJ (US); Avneesh Agrawal, San Diego, CA (US); Ahmad Jalali, Rancho Santa Fe, CA (US); Charles A. Bergan, Cardiff, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1121 days.

(21) Appl. No.: 11/413,355

(22) Filed: Apr. 28, 2006

(65) Prior Publication Data

US 2006/0245395 A1    Nov. 2, 2006

Related U.S. Application Data

(60) Provisional application No. 60/676,083, filed on Apr. 28, 2005.

(51) Int. Cl.
*H04W 36/00* (2009.01)
*H04W 36/14* (2009.01)
*H04W 88/06* (2009.01)
*H04W 80/00* (2009.01)
*H04W 92/02* (2009.01)
*H04W 84/04* (2009.01)

(52) U.S. Cl.
CPC .............. *H04W 36/14* (2013.01); *H04W 88/06* (2013.01); *H04W 80/00* (2013.01); *H04W 92/02* (2013.01); *H04W 84/042* (2013.01)
USPC ........ 455/436; 455/417; 455/435.1; 370/331; 370/401; 370/259

(58) Field of Classification Search
USPC ......... 370/328, 331, 401, 259, 355, 338, 320, 370/456, 468; 455/403, 435.1, 412.2, 455/404.1, 404.2, 421, 417, 436, 430, 455/426.1, 450, 427, 456.2; 340/7.1; 379/29.04; 375/133, 222
See application file for complete search history.

(56) References Cited

U.S. PATENT DOCUMENTS 6,473,413 B1 * 10/2002 Chiou et al. .................. 370/331
6,725,044 B2 * 4/2004 Verma et al. .................. 455/444

(Continued)

FOREIGN PATENT DOCUMENTS

EP    1182900 A1    2/2002
EP    1392077 A1    2/2004

(Continued)

OTHER PUBLICATIONS

Wikipedia, IP Multimedia Subsystem (IMS), Wikipedia, 12 pages.*

(Continued)

*Primary Examiner* — Mahendra Patel
(74) *Attorney, Agent, or Firm* — Anthony R. Morris

(57) ABSTRACT

A wireless communications device is disclosed. The wireless communications device is configured to support a call over a cellular network or an IP network to a remote communications device. The wireless communications device is further configured to handoff the call between the cellular network and the IP network. An Interworking Function (IWF) is configured to maintain a call between a wireless communications device and a communications device as the wireless communications device is handed off between a cellular network and an IP network.

52 Claims, 4 Drawing Sheets

(56) References Cited

U.S. PATENT DOCUMENTS

| | | | |
|---|---|---|---|
| 6,888,803 B1* | 5/2005 | Gentry et al. | 370/259 |
| 6,996,079 B1* | 2/2006 | Bergenwall et al. | 370/331 |
| 7,039,027 B2* | 5/2006 | Bridgelall | 370/329 |
| 7,149,524 B2* | 12/2006 | Reynolds | 455/437 |
| 7,245,917 B2* | 7/2007 | Chiueh | 455/442 |
| 7,400,886 B2* | 7/2008 | Sahim et al. | 455/444 |
| 7,734,909 B1* | 6/2010 | Roush et al. | 713/154 |
| 2002/0142761 A1* | 10/2002 | Wallstedt et al. | 455/416 |
| 2003/0119490 A1 | 6/2003 | Mohammed | |
| 2003/0134638 A1 | 7/2003 | Sundar et al. | |
| 2004/0137902 A1* | 7/2004 | Chaskar et al. | 455/436 |
| 2004/0146021 A1 | 7/2004 | Fors et al. | |
| 2004/0179666 A1* | 9/2004 | Milton | 379/201.02 |
| 2005/0013421 A1* | 1/2005 | Chavez et al. | 379/93.09 |
| 2005/0096024 A1* | 5/2005 | Bicker et al. | 455/417 |
| 2006/0209882 A1* | 9/2006 | Han et al. | 370/465 |
| 2006/0239277 A1* | 10/2006 | Gallagher | 370/401 |

FOREIGN PATENT DOCUMENTS

| | | |
|---|---|---|
| JP | 2005080197 A | 3/2005 |
| WO | WO9959364 | 11/1999 |
| WO | 0072536 A1 | 11/2000 |
| WO | WO03090013 | 10/2003 |
| WO | WO2004068768 | 8/2004 |
| WO | WO2004082219 A2 | 9/2004 |
| WO | 2005002267 A2 | 1/2005 |
| WO | WO2005006570 A2 | 1/2005 |

OTHER PUBLICATIONS

International Search Report and Written Opinion—PCT/US2006/016516, International Search Authority—European Patent Office—Sep. 14, 2006.

* cited by examiner

WIRELESS HANDOFFS BETWEEN MULTIPLE WIRELESS NETWORKS

CROSS REFERENCE TO RELATED APPLICATIONS

This application claims the benefit of the filing date of U.S. provisional application having Ser. No. 60/676,083, filed on Apr. 28, 2005 and entitled "IP to Wireless Handoff," the contents of which is incorporated herein by reference.

BACKGROUND

1. Field

The present disclosure relates generally to communications, and more particularly, to wireless handoffs between multiple wireless networks.

2. Background

The demand for mobile access to information has led to the development of an ever increasing number of wireless networks. Associated with each wireless network is a wireless communications standard that allows two wireless devices that support the standard to freely communicate over the network. CDMA2000 1x is just one example of a wireless communications standard that provides wide area telephony and data services. Promulgated by the Third Generation Partnership Project 2 (3GPP2), CDMA2000 1x is a wireless communications standard based on Code Division Multiple Access (CDMA) technology. CDMA is a technology that allows multiple users to share a common communications medium using spread-spectrum processing.

In addition to CDMA2000 1x, many other wireless communication standards exist today. By way of example, CDMA2000 1xEV-DO is a wireless communications standard optimized for data transmission using CDMA technology. Global System for Mobile Communications (GSM) is another wireless communications standard which is commonly employed in Europe. Unlike CDMA2000 1x and CDMA 1xEV-DO, GSM uses narrowband Time Division Multiple Access (TDMA) to support wireless telephony and data services. Enhanced Data for GSM Evolution (EDGE) is a further development of the GSM protocol designed to handle high speed data transmission. Some other wireless communication standards include General Packet Radio Service (GPRS) which supports high speed data services with data rates suitable for e-mail and web browsing applications and Universal Mobile Communications System (UMTS) which can deliver broadband voice and data for audio and video applications.

These wireless communication standards are generally used over cellular networks. The term "cellular network" is intended to cover any wireless network in which the service area is broken up into cellular regions, without regard to the type of service provided. Thus, a cellular network as used herein would includes any cellular topology that provides cellular services, Personal Communications Services (PCS), or any other type of services. Moreover, the cellular network may be based on any suitable wireless communications standard incorporating one or more multiple access technologies, including by way of example, CDMA, Wideband CDMA (WCDMA), Direct Sequence CDMA (DS-CDMA), TDMA, Frequency Division Multiple Access (FDMA), Orthogonal Frequency Division Multiple Access (OFDMA), or the like.

As the demand for wireless access to information continues to increase, wireless communication devices are evolving to support integrated voice, data, and streaming media while providing seamless network coverage between cellular and Internet-Protocol (IP) networks. These IP networks may be accessed by a wireless device through one or more access points (APs) residing in a wireless Local Area Network (LAN). Typically, multiple wireless LANs will be distributed throughout the cellular network. These LANs may use any suitable wireless data networking protocol, including by way of example, WiFi, WiMax, Bluetooth, HomeRF, Ultra-Wide-Band (UWB), or the like.

The existence of wireless LANs in cellular networks provides a unique opportunity to increase user capacity by extending cellular communications to the infrastructure of the IP network. Under certain circumstances, cost savings may be realized by routing communications over the IP network. However, the commercial viability of this approach depends largely on the ability to maintain active calls across these networks.

SUMMARY

A wireless communications device is disclosed. The wireless communications device is configured to support a call over a cellular network or an IP network to a remote communications device. The wireless communications device is further configured to handoff the call between the cellular network and the IP network. An Interworking Function (IWF) is configured to maintain a call between a wireless communications device and a communications device as the wireless communications device is handed off between a cellular network and an IP network.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

In the following detailed description, various techniques will be described in connection with a wireless device traveling through a cellular network with one or more wireless LANs dispersed throughout the cellular coverage region. While such techniques may be well suited for these applications, those skilled in the art will readily appreciate that these techniques can be extended to wireless devices capable of accessing various combinations of multiple networks. By way of example, these techniques may be applied to a wireless device capable of switching between a CDMA2000 1x network and a GSM network. Accordingly, any reference to a wireless device capable of communicating with a cellular or IP network is intended only to illustrate various aspects of the present invention, with the understanding that these aspects have a wide range of applications.

Figure 1:
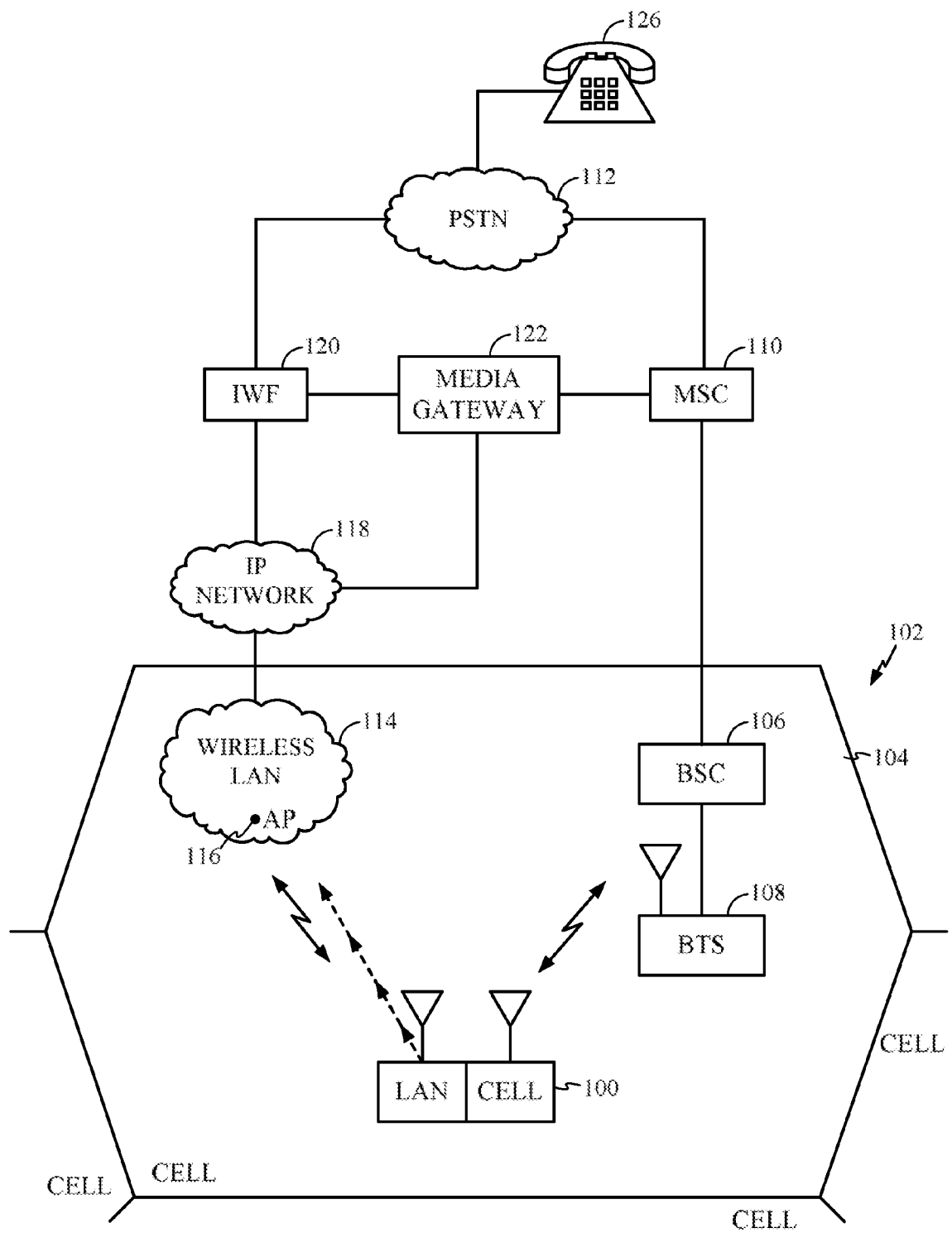
FIG. 1 is a conceptual block diagram of an embodiment of a communications system.

FIG. 1 is a conceptual block diagram of an embodiment of a communications system. A wireless device 100 is shown moving through a cellular network 102 by a series of broken lines. The cellular network 102 is typically be made up of many cells, but a single cell 104 is shown in FIG. 1 for simplicity. Located within the cell 104 is a Base Transceiver Station (BTS) 108 which includes one or more transceivers placed at a fixed site to provide radio coverage through the cell 104 using any suitable wireless communications standard, such as CDMA2000 1x, CDMA2000 1xEV-DO, GSM, EDGE, GPRS, UMTS, or any other suitable wireless communications standard currently known or developed in the future. The cellular network 102 also includes a Base Station Controller (BSC) 106 capable of allocating and managing the radio resources of the BTSs dispersed throughout the cellular network 102. An Interworking Function (IWF), which may include a Mobile Switching Center (MSC) 110, may be used to provide the wireless device 100 with access to a Public Switched Telephone Network (PSTN) 112. The term "IWF" is intended to be broadly construed to encompass any entity that provides a means for two different technologies to interoperate.

The cellular network 102 is also shown with a wireless LAN 114 in the cell 104, but may have any number of wireless LANs located in the cell 104 or anywhere else in the network 102. The wireless LAN 114 may use any suitable wireless data networking protocol, including by way of example, WiFi, WiMax, Bluetooth, HomeRF, Ultra-WideBand (UWB), or the like. The wireless LAN 114 includes an AP 116 that allows the wireless device 100 to connect to an IP network 118. An Interworking Function (IWF) 120 provides the wireless device 100 with wireless access to a Public Switched Telephone Network (PSTN) 112 for Voice over IP (VoIP) and other communications. The IWF 120 may use a Session Initiation Protocol (SIP), or some other suitable protocol, to establish, maintain and terminate calls with wireless devices over the IP network 118.

The wireless device 100 may be any communications device capable of wireless telephony and/or data communications, including by way of example, a wireless telephone, a personal digital assistant (PDA), a laptop computer, a modem, a game console, or the like. The wireless device 100 is capable of maintaining a call with a remote communications device, such as a landline 126, across the cellular and IP networks 102, 118, respectively. In one embodiment, the wireless device 100 has a cellular phone number and an IP phone number, which allows the landline phone 126 (or other remote communications device) to access the wireless device 100 over the cellular network 102 or the IP network 118.

A media gateway 122 is shown in communication with the MSC 110 and the IWF 120. The wireless device's cellular and IP phone numbers are provisioned in the media gateway when the cellular user subscribes to wireless LAN services. In a manner to be described in greater detail later, these phone numbers are used by the media gateway 122 to facilitate the handoff of the wireless device 100 between the cellular network 102 and the IP network 118 during an active call. The media gateway 122 can be a separate entity as shown in FIG. 1, or alternatively be integrated into IWF 120 or be part of the IP network 118.

As the wireless device 100 travels into the coverage region of the wireless LAN 114, it detects a beacon signal from the AP 116. Using the beacon signal, the wireless device 100 establishes a wireless link with the AP 116 to gain access to the IP network 118. Once this occurs, the IWF 120 can connect the wireless device 100 through the PSTN 112 to the landline phone 126 to support a call. By way of example, when a user on the landline phone 126 dials the wireless device's IP phone number, the call is routed by the PSTN 112 to the IWF 120. The IWF 120 then signals the wireless device 100 using a page to establish an end-to-end connection between the wireless device 100 and the landline phone 126 to support the call over the IP network 118.

Once a call is established over the IP network 112 between the wireless device 100 and the landline phone 126, the media gateway 122 begins monitoring the quality of service over the IP network 112. Alternatively, another entity in the communications system may perform this function and report the results back to the media gateway 122. In any event, when the quality of service drops below a certain level, the media gateway 122 may determine that the wireless device 100 has traveled outside the coverage region of the wireless LAN 114 and initiate a handoff of the call to the cellular network 102.

The manner in which the quality of service may be monitored by the media gateway 122 may vary depending upon the specific application, the performance parameters, the overall design constraints, and other factors that might be relevant to the design of a communications system. In one embodiment of the media gateway 122, the quality of service for VoIP communications can be determined by monitoring the arrival of voice packets at the IWF 120. Since most vocoders employed in wireless devices generate a continuous flow of packets, the disruption of that continuous flow can provide a fairly good indicator that the wireless device 104 has traveled beyond the coverage region of the wireless LAN 114. In another embodiment of the media gateway 122, the quality of service for VoIP communications may be determined by monitoring the delay, jitter, and/or packet loss over the IP network 118. In this embodiment, the media gateway 122 may initiate a handoff to the cellular network 102, even if the wireless device 100 is within the coverage region of the wireless LAN 118, if the quality of the network connection is poor due to excessive delay, jitter, and/or lost packets.

The handoff of a call between the wireless device 100 and the landline phone 126 from the IP network 118 to the cellular network 102 may be initiated by the media gateway 122 by sending a handoff request to the IWF 120. In response to the handoff request, the IWF 120 may coordinate a soft handoff by providing certain functionality that emulates a three-way conference call. In particular, soft handoff is performed by conferencing in the wireless device 100 over the cellular network 102 into the existing call and then disconnecting the wireless device 100 over the IP network 118 from the call.

Once the wireless device 100 is conferenced into the call over the cellular network 102, the IWF 120 suppress traffic over the cellular network 102 until the wireless device 100 is disconnected from the call over the IP network 118.

The IWF 120 coordinates a soft handoff by retrieving the cellular phone number for the wireless device 120 from the media gateway 122 and using it to signal the wireless device 100 over the cellular network 102. When the IWF 120 signals the wireless device 100 by dialing the wireless device's cellular number, which causes the PSTN 112 set up a connection between the IWF 120 and the MSC 110. The MSC 110 then prompts the BSC 106 to send signaling messages to the BTS 108 to page the wireless device 100. A SMS message may also be sent by the IWF 120 to the wireless device 100 to direct the wireless device 100 to answer the page even though it is currently engaged in another call over the IP network 118, and to answer the page in a way that is transparent to the user to ensure a seamless transition between networks. Alternatively, the IWF 120 can use caller ID or some other method to indicate to the wireless device 100 that the page should be answered in a similar way. In any event, the wireless device 100 establishes the appropriate traffic and control channels with the BTS 108 in response to the page, which enables the IWF 120 to conference the wireless device 100 into the call through the cellular network 102. Once this connection is established, the IWF 118 can complete the handoff by terminating the connection with the wireless device 100 over the IP network 118. When the handoff is complete, traffic between the landline phone 126 and the MSC 110 is routed through the IWF 120.

In another embodiment of the IWF 120, a hard handoff of the call to the cellular network 102 may be performed. A hard handoff begins exactly like a soft handoff, with the IWF 120 retrieving the cellular phone number for the wireless device 100 from the media gateway 122 and using it to call the wireless device 100 on the cellular network 102. But, the primary difference is that the IWF 120 terminates the connection between the landline phone 126 and the wireless device 100 over the IP network 118 immediately, thus resulting in a brief disconnect until the landline phone 126 is connected through the cellular network to the wireless device 100. Once connected, all traffic between the landline phone 126 and the wireless device 100 over the cellular network 102 are routed through the IWF 120. Again, the call from the IWF 120 to the wireless device 100 through the cellular network 102 should be transparent to the user to create a seamless transition between networks.

Alternatively, the wireless device 100 may be responsible for coordinating the handoff of the call to the cellular network 102. In this alternative embodiment, the handoff is initiated by the media gateway 122 by signaling a handoff request to the wireless device 100 over the IP network 118. In response, the wireless device 100 establishes traffic and control channels with the BTS 108 and then uses the IWF's phone number to establish a connection with the IWF 120 over the cellular network 102. The phone number for the IWF 120 may be provided to the wireless device 100 when the call over the IP network 118 is set-up. In the case of a soft handoff, the connection between the landline phone 126 and wireless device 100 over the IP network 118 is terminated after the wireless device is conferenced into the call over the cellular network 102. In the case of a hard handoff, the connection between the landline phone 126 and the wireless device 100 over the IP network 118 may be terminated before the connection between the two is made through the cellular network 102.

In the various embodiments of the communications system described thus far, the media gateway 122 initiates the handoff when the quality of service over the IP network 118 drops below a certain level. In an alternative embodiment, the wireless device 100 may initiate the handoff. In this embodiment, the wireless device 100 determines the quality of the wireless link by monitoring one or more parameters, including by way of example, the signal strength, bit error rate, carrier-to-interference ratio, etc. When the wireless device 100 determines that the quality of the wireless link is unacceptable, it signals the IWF 120 by sending a handoff request over the IP network 118. In response, the IWF 120 connects the wireless device 100 through the cellular network 102 to the existing call in any way described above, or in any other suitable way.

An active call between the landline phone 126 and the wireless device 100 can also be handed off from the cellular network 102 to the IP network 118. In this example, a call may be initially placed to the wireless device 100 by dialing the wireless device's cellular number on the landline phone 126. The call is routed by the PSTN 112 to the MSC 110, which prompts the BSC 106 to send signaling messages to the BTS 108 to page the wireless device 100. The wireless device 100 establishes the appropriate traffic and control channels with the BTS 108, and the MSC 110 connects the call between the wireless device 100 and the landline phone 126.

As the wireless device 100 travels into the coverage region of the wireless LAN 114, it detects the beacon signal from the AP 116. Using the beacon signal, the wireless device 100 establishes a wireless link with the AP 116 to gain access to the IP network 118. Once this occurs, the wireless device 100 uses the phone number for the MSC 110 that it received during the set-up of the call over the cellular network 102 to establish a connection with the MSC 110 over the IP network 118.

Alternatively, the wireless device 100 may signal a handoff request to the MSC 110 over the cellular network 102 once a wireless link is established with the AP 116. In response, the MSC 110 retrieves the wireless device's IP phone number provisioned in the media gateway 122 and uses it to call the wireless device 100 over the IP network 118. The IWF 120 then connects the wireless device 100 over the IP network 118 to the MSC 110. Appropriate SMS messaging, caller ID, or other methods may be used to seamless handoff the wireless device to the IP network 118. Depending upon whether a hard or soft handoff is performed, the connection between the landline phone 126 and the wireless device 100 through the cellular network 102 is terminated either before or after the connection between the two is made over the IP network 118.

In one embodiment of the MSC 110, the connection through the cellular network between the wireless device 100 and the MSC 110 is not terminated until the media gateway 122 determines that the quality of service over the IP network 118 is acceptable. In this embodiment, the wireless device 100 remains connected to the MSC 110 through both the cellular network 102 and the IP network 118 while the media gateway 122 determines the quality of service. In VoIP communications, by way of example, the media gateway may monitor disruptions in the continuous flow of packets and/or delay, jitter and lost packets over the IP network 118. When the quality of service reaches an acceptable level, the media gateway 122 signals the MSC 110 to release the connection between the landline phone 126 and the wireless device through the cellular network 102. Once this occurs, traffic between the landline phone 126 and the wireless device 100 over the IP network is routed through the MSC 110.

Figure 2:
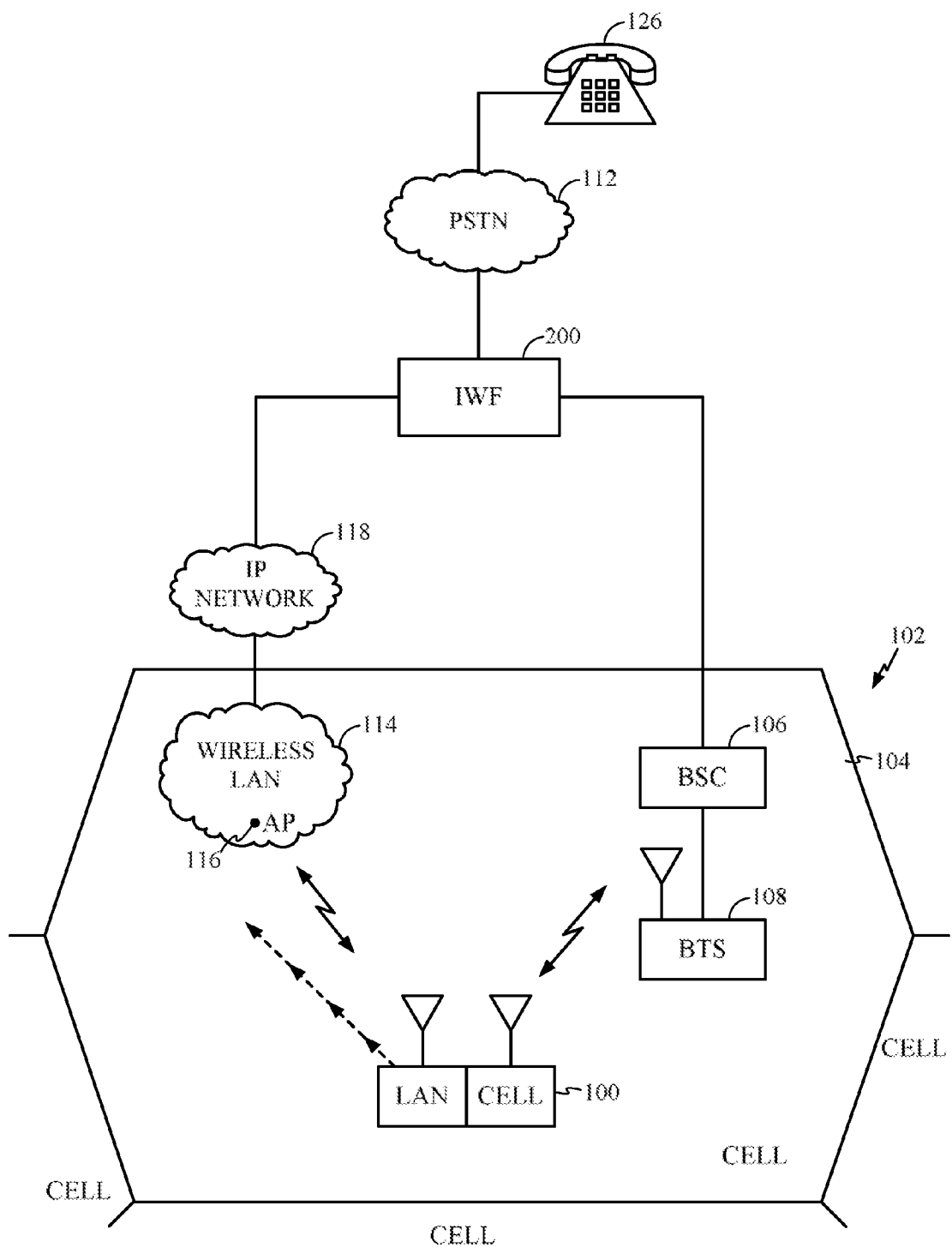
FIG. 2 is a conceptual block diagram of an alternative embodiment of a communications system.

FIG. 2 is a conceptual block diagram of an alternative embodiment of a communications system. In this embodiment, the functionality of the MSC 110, IWF 120, and media gateway 122 (described in connection with FIG. 1) are implemented with a single IWF 200. The IWF 200 connects the wireless device 100 to a remote communications device, such as the landline phone 126, through either the cellular network 102 or the IP network 102. When a handoff is required from one network to the other, the IWF 200 simply switches the call to the other network without having to go across an additional circuit through the PSTN 112. Since the handoff does not require any signaling over the PSTN 112, a single phone number can be used to access the mobile device 100 over both the cellular network 102 and the IP network 118. When a user on the landline phone 126 dials the wireless device's phone number, the PSTN 112 routes the call to IWF 200. The IWF 200 then determines whether to route the call over the cellular network 102 or the IP network 118 depending on one or more factors that may vary with the specific application and the overall design constraints imposed on the system.

When a call is routed over the IP network 118, the IWF 200 begins monitoring the quality of service over the IP network 118. When the quality of service drops below a certain level, the IWF 200 may initiate a handoff to the cellular network 102, either because the wireless device has traveled outside the coverage region of the wireless LAN 118 or the quality of service has become unacceptable. In any event, the quality of service may be monitored in any number of ways as described in more detail in connection with FIG. 1. In VoIP communications, by way of example, the IWF 200 may monitor any disruption in the continuous flow packets. Alternatively, or in addition to, the IWF 200 may monitor the delay, jitter, and/or lost packets over the IP network 118.

The IWF 200 initiates a handoff of a call from the IP network 118 to the cellular network 102 by prompting the BSC 106 to send signaling messages to the BTS 108 to page the wireless device 100. A SMS message, caller ID, or some other method may be used to direct the wireless device 100 to answer the page even though it is currently engaged in another call over the IP network 118, and to answer the page in a way that is transparent to the user to ensure a seamless transition between networks. In response to the page, the wireless device 100 establishes the appropriate traffic and control channels with the BTS 108, which enables the IWF 200 to connect the wireless device 100 through the cellular network 102 to the current call between the landline phone 126 and the wireless device 100 over the IP network 118. Depending upon whether a hard or soft handoff is performed, the connection between the landline phone 126 and the wireless device 100 through the cellular network 102 is terminated either before or after the connection between the two is made over the IP network 118.

Alternatively, the IWF 200 may initiate the handoff by signaling to the wireless device 100 over the IP network 118. In response to the signaling, the wireless device 100 establishes traffic and control channels with the BTS 108 and then establishes a connection with the IWF 200 over the cellular network 102. In the case of a soft handoff, the connection between the landline phone 126 and wireless device 100 over the IP network 118 is terminated after the connection between the two is made through the cellular network 102. In the case of a hard handoff, the connection between the landline phone 126 and the wireless device 100 over the IP network 118 may be terminated before the connection between the two is made through the cellular network 102.

In an alternative embodiment of the communications system shown in FIG. 2, the wireless device 100 may initiate the handoff. In this embodiment, the wireless device 100 determines the quality of the wireless link by monitoring one or more parameters, including by way of example, the signal strength, bit error rate, carrier-to-interference ratio, etc. When the wireless device 100 determines that the quality of the wireless link is unacceptable, the wireless device 100 is connected through the cellular network 102 to the call at the IWF 200. This connection may be initiated by the wireless device 100, or alternatively by the IWF 200 in response to signaling from the wireless device 100 requesting a handoff.

An active call between the landline phone 126 and the wireless device 100 can also be handed off from the cellular network 102 to the IP network 118. In this example, the wireless device 100 may be connected to the landline phone 126 over the cellular network 102 when the wireless device 100 travels into the coverage region of the wireless LAN 114. The wireless device 100 then establishes a wireless link with the AP 116 to gain access to the IP network 118. The wireless device 100 can then be connected to the landline phone 126 by the IWF 200 over the IP network 118. Depending upon whether a hard or soft handoff is performed, the connection between the landline phone 126 and the wireless device 100 through the cellular network 102 is terminated either before or after the connection between the two is made over the IP network 118.

In one embodiment of the IWF 200, the connection through the cellular network 102 between the wireless device 100 and the landline phone 126 is not terminated until the IWF 200 determines that the quality of service over the IP network 118 is acceptable. In this embodiment, the wireless device 100 remains connected to the landline phone 126 through both the cellular network 102 and the IP network 118 while the IWF 200 determines the quality of service of the IP network. In VoIP communications, by way of example, the IWF 200 monitors disruptions in the continuous flow of packets and/or jitter, delay and lost packets over the IP network 118. When the quality of service reaches an acceptable level, the IWF 200 terminates the connection between the wireless device 100 and the landline phone 126 over the cellular network 102.

Figure 3:
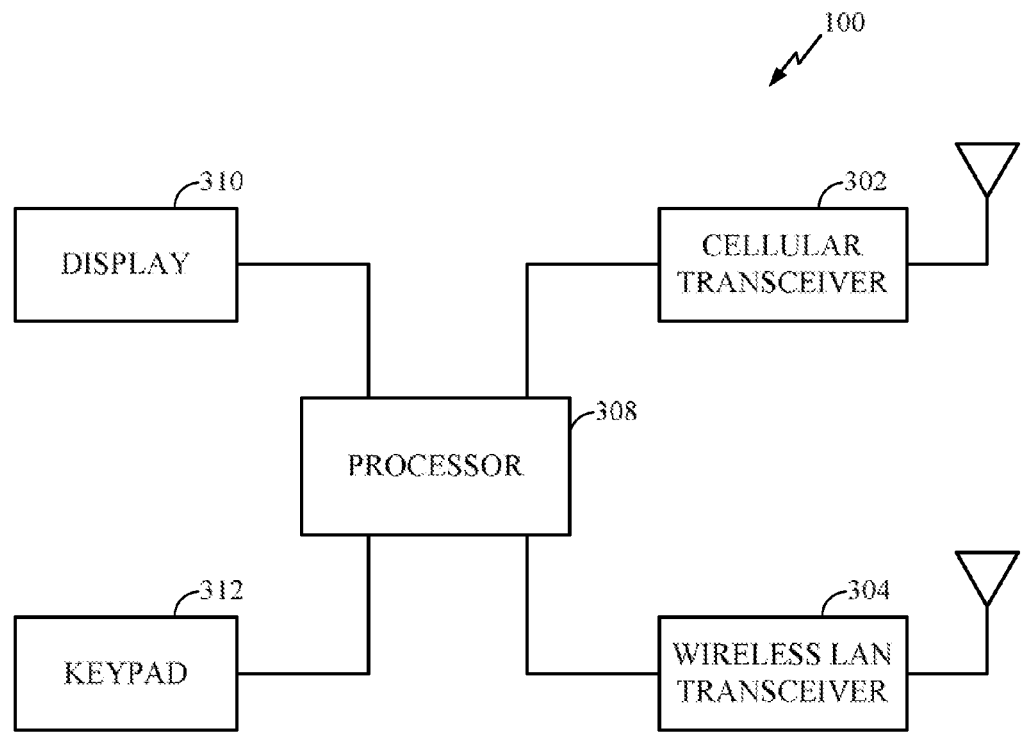
FIG. 3 is a functional block diagram illustrating a wireless device capable of supporting both cellular and wireless LAN communications.

FIG. 3 is a functional block diagram illustrating an example of a wireless device 100 capable of communicating over a cellular and IP network. The wireless device 100 may include a cellular transceiver 302 and a wireless LAN transceiver 304. In at least one embodiment of the wireless device 100, the cellular transceiver 302 is capable of supporting CDMA2000 1x communications with a BTS (not shown), and the wireless LAN transceiver 304 is capable of supporting Wi-Fi communications with an AP (not shown). Those skilled in the art will readily appreciate, however, that the concepts described in connection with the wireless device 100 can be extended to other cellular and wireless LAN technologies. The transceivers 302, 304 are shown as separate entities, but could be integrated into a single entity or distributed across multiple entities in the wireless device 100. Each of transceivers 302, 304 is shown with a separate antenna, but the transceivers 302, 304 could share a single broadband antenna.

The wireless device 100 is also shown with a processor 308 coupled to both transceivers 302, 304, however, a separate processor may be used for each transceiver in alternative embodiments of the wireless device 100. The processor 308 may be implemented with hardware, firmware, software, or any combination thereof. By way of example, the processor 308 may include a microprocessor (not shown). The microprocessor may be used to support software applications that, among other things, (1) control and manage access to the cellular and IP networks, and (2) interface the processor 308 to the keypad 310, display, 312, and other user interfaces (not shown). The processor 308 may also include a digital signal processor (DSP) (not shown) with an embedded software layer that supports various signal processing functions, such as spread-spectrum processing in the case of CDMA applications. The DSP may also perform vocoder functions to support telephony applications. The processor 308 may include computer-readable media implemented with one or more storage devices accessible by the microprocessor, DSP, and various other hardware components of the processor 308. The computer-readable media may also encompass a carrier wave that encodes a data signal. The manner in which the processor 308 is implemented will depend on the particular application and the design constraints imposed on the overall system. Those skilled in the art will readily recognize the interchangeability of hardware, firmware, and software configurations under these circumstances, and how best to implement the described functionality for each particular application.

Figure 4:
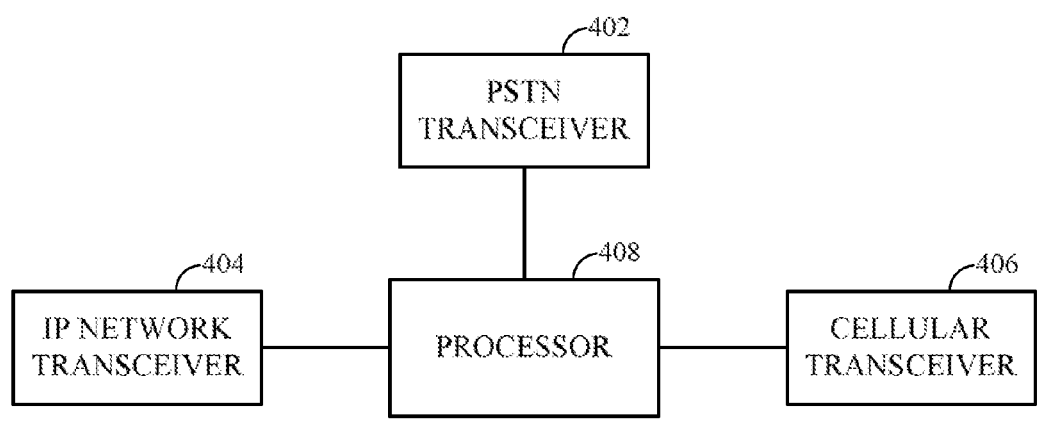
FIG. 4 is a functional block diagram illustrating an Interworking Function (IWF)

FIG. 4 is a functional block diagram of an IWF. The IWF may be the IWF 120 connected to the IP network 118 or the MSC 110 connected to the cellular network 102 shown in FIG. 1. Alternatively, the IWF may be the IWF 200 connected to both the IP network 118 and the MSC 110 shown in FIG. 2. In any event, the IWF includes transceivers 402, 404, 406 for interfacing with the PSTN, IP network, and cellular network, respectively. A processor 408 may be used to manage and control the traffic handled by the transceivers. In addition, the processor 408 may provide certain functionality to facilitate the handoff of a call between the IP and cellular networks, including providing three way conferencing calling as described in greater detail above. These functions may be implemented as individual or shared hardware components, as software applications running on one or more hardware components, or any combination thereof. By way of example, the processor 408 may be implemented with a microprocessor that supports multiple software applications. A Digital Signal Processor (DSP) with an embedded software layer may be used to assist the microprocessor by performing part, or all, of one or more processor functions. The processor 406 may include one or more other components, either alone or in combination with a microprocessor and or DSP. Computer-readable media may include one or more storage devices accessible by the various hardware components of the processor 406 and also encompasses a carrier wave that encodes a data signal. Those skilled in the art will recognize the interchangeability of hardware, firmware, and software configurations under these circumstances, and how best to implement the described functionality for each particular application.

Figure 5:
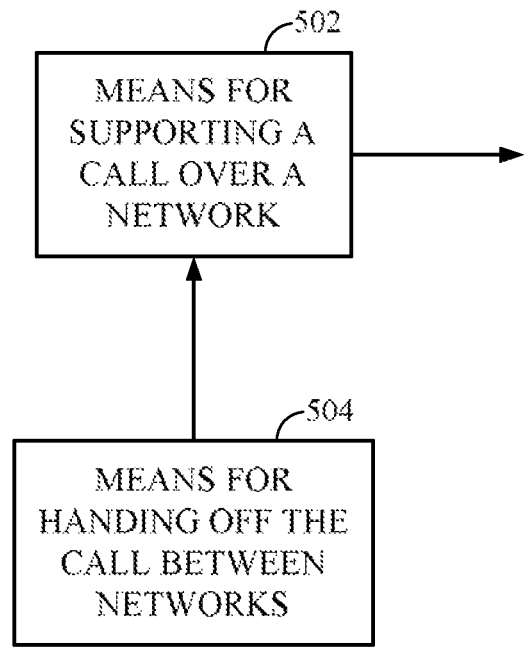
FIG. 5 is a functional block diagram of an alternative embodiment of a wireless communications device.

FIG. 5 is a functional block diagram of an alternative embodiment of a wireless communications device. The wireless communications device includes means for supporting a call over a cellular network or an IP network to a remote communications device 502, and means for handing off the call between the cellular network and the IP network 504.

Figure 6:
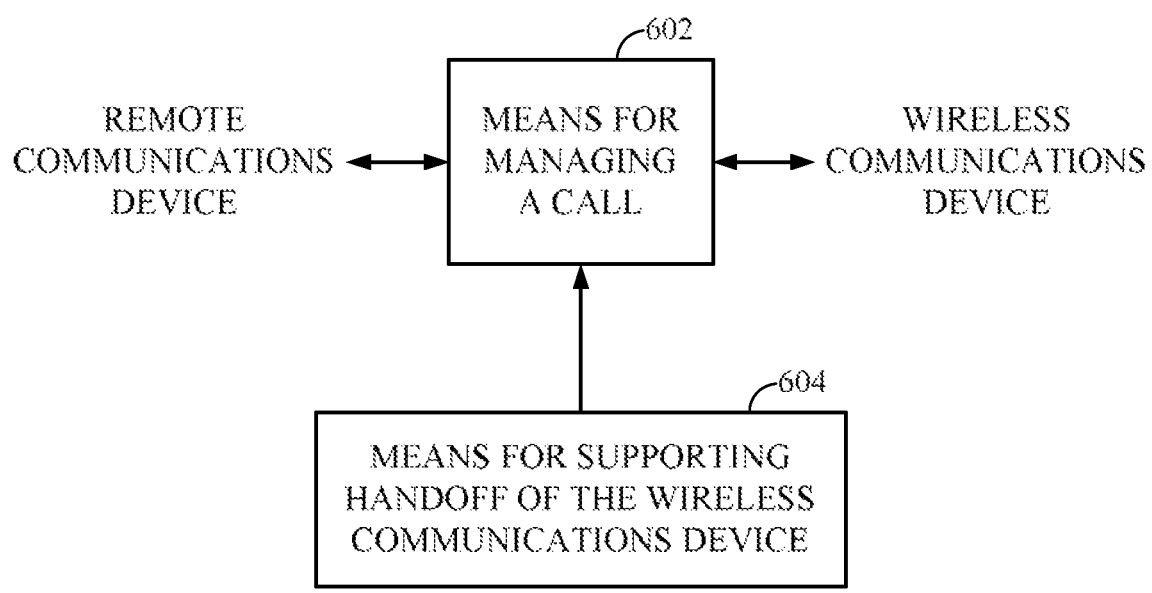
FIG. 6 is a functional block diagram of an alternative embodiment of an IWF.

FIG. 6 is a functional block diagram of an alternative embodiment of an IWF. The IWF includes means for supporting handing off a wireless device between a cellular network and an IP network 604, and means for maintaining a call between a wireless communications device and a communications device as the wireless communications device is handed off between a cellular network and an IP network 602.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A wireless communications device, comprising:
a processor configured to support a call over a first network that uses a first access technology or a second network that uses a second access technology with a remote communications device, the processor being further configured to handoff the call between the first network and the second network in a way that is transparent to a user of the wireless communications device;
wherein the processor is further configured to handoff the call from the first network to the second network by establishing a connection to the second network to support the call with the remote communications device, answering a page in response to a caller identification message from a network entity that directs the wireless communications device to answer the page while currently engaged in the call over the first network, conferencing the wireless communications device into the call over the second network, and terminating a connection to the first network that was previously supporting the call with the remote communications device; and wherein the processor is further configured to establish the connection to the second network in response to signaling from the network entity supporting a connection between the wireless communications device and the remote communications device over the first network, the signaling from the network entity configured by the network entity to request that the processor establish the connection.

2. The wireless communications device of claim 1 wherein the processor is further configured to support the call over both of the networks when the connection to the second network is established before the connection to the first network is terminated.

3. The wireless communications device of claim 1 wherein the processor is further configured such that it will not establish a connection to the second network if it receives a signal from any source other than the network entity.

4. The wireless communications device of claim 1 wherein the processor is further configured to establish the connection to the second network if a message is received by the processor indicating that the signaling is from the network entity.

5. The wireless communications device of claim 4 wherein the message comprises a caller identification message or a short message service message.

6. The wireless communications device of claim 1 wherein the processor is further configured to handoff the call by establishing a connection to the second network while supporting the call over the first network, the processor being further configured to use the connection to signal an interworking function, currently supporting a connection between the wireless and remote communication devices over the first network, to allow the wireless communications device to join the call over the second network.

7. The wireless communications device of claim 6 wherein the processor is further configured to establish the connection and signal the interworking function in response to a signal received over the first network.

8. A method of communicating from a wireless communications device, comprising:
supporting a call over a first network that uses a first access technology or a second network that uses a second access technology with a remote communications device; and
handing off the call from the first network to the second network by establishing a connection to the second network to support the call with the remote communications device, answering a page in response to a caller identification message from a network entity that directs the wireless communications device to answer the page while currently engaged in the call over the first network, conferencing the wireless communications device into the call over the second network, and terminating a connection to the first network that was previously supporting the call with the remote communications device;
wherein the connection to the second network is established in response to signaling from the network entity supporting a connection between the wireless and remote communication devices over the first network, the signaling from the network entity configured by the network entity to request that the wireless communications device establish the connection;
wherein the handoff of the call from the first network to the second network is transparent to a user on the call.

9. The method of claim 8 wherein the handoff of the call further comprises supporting the call over both of the networks when the connection to the second network is established before the connection to the first network is terminated.

10. The method of claim 8 wherein the connection to the second network is established in response to a message being received indicating that the signaling is from the network entity.

11. The method of claim 10 wherein the message comprises a caller identification message or a short message service message.

12. The method of claim 8 wherein the handoff of the call comprises establishing a connection to the second network while supporting the call over the first network, and using the connection to signal an interworking function, currently supporting a connection between the wireless and remote communication devices over the first network, to allow the wireless communications device to join the call over the second network.

13. The method of claim 12 wherein the connection is established and the interworking function is sent a signal in response to a signal received over the first network.

14. A wireless communications device, comprising:
means for supporting a call over a first network that uses a first access technology or a second network that uses a second access technology with a remote communications device; and
means for handing off the call from the first network to the second network by establishing a connection to the second network to support the call with the remote communications device, answering a page in response to a caller identification message from a network entity that directs the wireless communications device to answer the page while currently engaged in the call over the first network, conferencing the wireless communications device into the call over the second network, and terminating a connection to the first network that was previously supporting the call with the remote communications device;
wherein the connection to the second network is established in response to signaling from the network entity supporting a connection between the wireless and remote communication devices over the first network, the signaling from the network entity configured by the network entity to request that the processor establish the connection;
wherein the handoff of the call from the first network to the second network is transparent to a user on the call.

15. The wireless communications device of claim 14 wherein the means for handing off the call is further configured to support the call over both of the networks when the connection to the second network is established before the connection to the first network is terminated.

16. The wireless communications device of claim 14 wherein the means for handing off the call is further configured such that it will not establish a connection to the second network if it receives a signal from any source other than the network entity.

17. The wireless communications device of claim 14 wherein the means for handing off the call is further configured to establish the connection to the second network if a message is received by the wireless communications device indicating that the signaling is from the network entity.

18. The wireless communications device of claim 17 wherein the message comprises a caller identification message or a short message service message.

19. The wireless communications device of claim 14 wherein the means for handing off the call is further configured to handoff the call by establishing a connection to the second network while supporting the call over the first network, the wireless communications device being further configured to use the connection to signal an interworking function, currently supporting a connection between the wireless and remote communication devices over the first network, to allow the wireless communications device to join the call over the second network.

20. The wireless communications device of claim 19 wherein the means for handing off the call is further configured to establish the connection and signal the interworking function in response to a signal received over the first network.

21. A processor, configured to:
support a call involving a wireless communications device over a first network that uses a first access technology or a second network that uses a second access technology with a remote communications device; and
handoff the call from the first network to the second network by establishing a connection to the second network to support the call with the remote communications device, answering a page in response to a caller identification message from a network entity that directs the wireless communications device to answer the page while currently engaged in the call over the first network, conferencing the wireless communications device into the call over the second network, and terminating a connection to the first network that was previously supporting the call with the remote communications device;
wherein the connection to the second network is established in response to signaling from the network entity supporting a connection between the wireless and remote communication devices over the first network, the signaling from the network entity configured by the network entity to request that the processor establish the connection;
wherein the handoff of the call from the first network to the second network is transparent to a user on the call.

22. The processor of claim 21 further configured to support the call over both of the networks when the connection to the second network is established before the connection to the first network is terminated.

23. The processor of claim 21 further configured such that it will not establish a connection to the second network if it receives a signal from any source other than the network entity.

24. The processor of claim 21 further configured to establish the connection to the second network if a message is received by the processor indicating that the signaling is from the network entity.

25. The processor of claim 24 wherein the message comprises a caller identification message or a short message service message.

26. The processor of claim 21 further configured to handoff the call by establishing a connection to the second network while supporting the call over the first network, the processor being further configured to use the connection to signal an interworking function, currently supporting a connection between the wireless and remote communication devices over the first network, to allow the wireless communications device to join the call over the second network.

27. The processor of claim 26 further configured to establish the connection and signal the interworking function in response to a signal received over the first network.

28. A non-transitory computer-readable storage media containing a set of instructions for a processor to:
support a call involving a wireless communications device over a first network that uses a first access technology or a second network that uses a second access technology with a remote communications device; and
handoff the call from the first network to the second network by establishing a connection to the second network to support the call with the remote communications device, answering a page in response to a caller identification message from a network entity that directs the wireless communications device to answer the page while currently engaged in the call over the first network, conferencing the wireless communications device into the call over the second network, and terminating a connection to the first network that was previously supporting the call with the remote communications device;
wherein the connection to the second network is established in response to signaling from the network entity supporting a connection between the wireless and remote communication devices over the first network, the signaling from the network entity configured by the network entity to request that the processor establish the connection;
wherein the handoff of the call from the first network to the second network is transparent to a user on the call.

29. The non-transitory computer readable storage media of claim 28 wherein the handoff of the call further comprises supporting the call over both of the networks when the connection to the second network is established before the connection to the first network is terminated.

30. The non-transitory computer readable storage media of claim 28, wherein the connection to the second network is established in response to a message being received indicating that the signaling is from the network entity.

31. The non-transitory computer readable storage media of claim 30 wherein the message comprises a caller identification message or a short message service message.

32. The non-transitory computer readable storage media of claim 28 wherein the handoff of the call comprises establishing a connection to the second network while supporting the call over the first network, and using the connection to signal an interworking function, currently supporting a connection between the wireless and remote communication devices over the first network, to allow the wireless communications device to join the call over the second network.

33. The non-transitory computer readable storage media of claim 32 wherein the connection is established and the interworking function is sent a signal in response to a signal received over the first network.

34. A network entity, comprising:
a processor configured to maintain a call between a wireless communications device and a communications device as the wireless communications device is handed off between a first network that uses a first access technology and a second network that uses a second access technology, wherein the processor is further configured to provide a three-way conference call functionality, the processor further being configured to support the handoff of the wireless device by sending a caller identification message that directs the wireless communications device to answer a page while currently engaged in the existing call and conferencing into the existing call over one of the networks while the wireless communications device is connected through the other network.

35. The network entity of claim 34 wherein the processor is further configured to support the handoff of the wireless device by terminating a connection over the other network to the wireless communications device.

36. The network entity of claim 35 wherein the processor is further configured to suppress traffic over said one of the networks while the three way conference call is maintained.

37. A network entity, comprising:
- means for supporting handing off a wireless device between a first network that uses a first access technology and a second network that uses a second access technology; and
- means for maintaining a call between a wireless communications device and a communications device as the wireless communications device is handed off between the first network and the second network, wherein the means for maintaining further comprise means for providing three way conference call functionality to maintain the call between the wireless communications device and the communications device as the wireless communications device is handed off between the first network and the second network, the three way conferencing means being configured to support the handoff of the wireless device by sending a caller identification message that directs the wireless communications device to answer a page while currently engaged in the existing call and conferencing into the existing call over one of the networks while the wireless communications device is connected through the other network.

38. The network entity of claim 37 wherein the means for supporting the handoff is further configured to support the handoff of the wireless device by terminating a connection over the other network to the wireless communications device.

39. The network entity of claim 38 further comprising means for suppressing traffic over said one of the network while the three way conference call is maintained.

40. A processor for a network entity configured to:
- support handing off a wireless device between a first network that uses a first access technology and a second network that uses a second access technology;
- maintain a call between a wireless communications device and a communications device as the wireless communications device is handed off between the first network and the second network; and
- provide three way conference call functionality, wherein the processor is further configured to support the handoff of the wireless device by sending a caller identification message that directs the wireless communications device to answer a page while currently engaged in the existing call and conferencing into the existing call over one of the networks while the wireless communications device is connected through the other network.

41. The processor of claim 40 further configured to support the handoff of the wireless device by terminating a connection over the other network to the wireless communications device.

42. The processor of claim 41 further configured to suppress traffic over said one of the network while the three way conference call is maintained.

43. A method of supporting communications from a network entity, comprising:
- supporting handing off a wireless device between a first network that uses a first access technology and a second network that uses a second access technology;
- maintaining a call between a wireless communications device and a communications device as the wireless communications device is handed off between the first network and the second network; and
- providing three way conference call functionality, wherein the supporting the handoff of the wireless device further comprises sending a caller identification message that directs the wireless communications device to answer a page while currently engaged in the existing call and conferencing into the existing call over one of the networks while the wireless communications device is connected through the other network.

44. The method of claim 43 wherein the handoff of the wireless device is supported by terminating a connection over the other network to the wireless device.

45. The method of claim 44 further comprising suppressing traffic over said one of the networks while the three way conference call is maintained.

46. A non-transitory computer-readable storage media containing a set of instructions which, when executed by a processor at a network entity, cause the network entity to:
- support handing off a wireless device between a first network that uses a first access technology and a second network that uses a second access technology;
- maintain a call between a wireless communications device and a communications device as the wireless communications device is handed off between the first network and the second network; and
- provide three way conference call functionality, wherein the supporting the handoff of the wireless device further comprises sending a caller identification message that directs the wireless communications device to answer a page while currently engaged in the existing call and conferencing into the existing call over one of the networks while the wireless communications device is connected through the other network.

47. The non-transitory computer readable storage media of claim 46 wherein the handoff of the wireless device is supported by terminating a connection over the other network to the wireless communications device.

48. The non-transitory computer readable storage media of claim 47 wherein the method further comprises suppressing traffic over said one of the network while the three way conference call is maintained.

49. A method of communicating from a wireless communications device, comprising:
- supporting a call over a first network that uses a first access technology or a second network that uses a second access technology to a remote communications device; and
- responsive to a request to handoff from the first network to the second network, handing off the call by establishing a connection to the second network to support the call with the remote communications device, answering a page in response to a caller identification message from a network entity that directs the wireless communications device to answer the page while currently engaged in the call over the first network, conferencing the wireless communications device into the call over the second network, and terminating a connection to the first network that was previously supporting the call with the remote communications device;
- wherein the handoff of the call from the first network to the second network is transparent to a user on the call.

50. The method of claim 49, wherein the request to handoff from the first network to the second network is sent from a media gateway to a network-side interworking function, and the interworking function initiates the connection establishment by calling the wireless communications device over the target network for the handoff.

51. The method of claim 49, wherein the request to handoff from the first network to the second network is received at the wireless communications device from a media gateway, and the wireless communications device initiates the connection establishment responsive to the handoff request.

52. The wireless communications device of claim 1, wherein the second network is an IP network, and wherein the wireless communications device connects to the internet protocol network via a local wireless area network.

* * * * *